Patented Apr. 30, 1940

2,198,865

UNITED STATES PATENT OFFICE 2,198,865

GUM AND PROCESS OF TREATING SAME

Richard P. Dyckman, Orange, N. J., assignor to L. A. Dreyfus Company, Rosebank, Staten Island, N. Y., a corporation of New York No Drawing. Application August 2, 1938, Serial No. 222,602

5 Claims. (Cl. 99—135)

This invention relates to gums and methods of treating the same, and more particularly to the improvement of gums for utilization in the production of chewing gum base type materials.

Jelutong, also known as pontianak, has been widely used in the manufacture of chewing gum base and related products. It is indigenous to particular sections of the Far East, namely, the Malay Peninsula, Sumatra and the Island of Borneo from which sections it is obtained. The Malay Peninsula includes the Federated Malay States, the Unfederated Malay States, Straits Settlements and a portion of Siam. And the jelutong coming from this peninsula is generally referred to as F. M. S. jelutong in the trade. F. M. S. jelutong has qualities making it superior for chewing gum base use over the jelutong obtained from the islands referred to. It is difficult to fix the exact reason for the superiority of F. M. S. jelutong from a chemical standpoint. Although it is known that the rubber content of the island jelutong is somewhat lower, this is not sufficient to account for the differences in the two types of jelutong. The inferior character of island jelutong may be due to a variety of conditions, possibly in part to climate and soil, possibly in part to botanical variation, but it is more likely that the open character of the country, and the superiority in intelligence of the natives who gather and prepare the F. M. S. jelutong, makes possible better supervision and education in the methods of preparation which are undoubtedly contributing factors making for the superiority of F. M. S. jelutong. In any event, this superiority is recognized in the trade by the much higher price which F. M. S. jelutong demands. Its superior cleanliness is readily apparent, but a more particularly important factor of superiority lies in its ability to withstand oxidation to a much greater extent than does island jelutong. Furthermore the supply of F. M. S. or Malayan jelutong is quite limited so that the supply of chewing gum base made therefrom is correspondingly limited and more expensive.

Oxidation, to which all jelutong is subject in a greater or less degree, involves actual combination of constituents of the jelutong with oxygen of the air. As oxidation proceeds the rubber content becomes progressively lessened by being converted into resins. The jelutong thereby becomes progressively less rubbery, more resinous and less firm in consistency. Carried to an extreme, oxidation will cause complete loss of the rubbery qualities of jelutong rendering it entirely resinous, crumbly and unfit for use as an ingredient of chewing gum.

Oxidation may occur in jelutong under storage and transit conditions, during processing and manufacturing, and finally in finished products when combined with other ingredients as in chewing gum base or chewing gum.

In storage or transit, oxidation is completely undesirable but during processing as in the manufacture of chewing gum base some degree of controlled oxidation is desirable and necessary to produce the peculiar combinations of qualities required for satisfactory chewing qualities.

In the processing of jelutong to produce chewing gum products certain steps are essential such as washing, heating, drying, melting, and combining it with other ingredients essential to the ultimate products. These processes will be described in more detail below but it may be said here that all of these processes are inevitably accompanied in varying degrees by oxidation. As stated, this oxidation is desirable in some degree but if it becomes excessive the resulting product will be inferior, of definitely lesser value or even entirely unfit for further use.

When F. M. S. jelutong is subjected to these processes, no difficulty is experienced from excessive oxidation due to its naturally superior resistance to this change. In the case of island jelutong, however, such oxidation occurs to an undesirable extent, and no method has been heretofore devised for the control of excessive oxidation during the operations and processes which are essential to the attainment of other necessary qualities in a chewing gum product. With this inferior jelutong such treatment may result in the loss of the very properties due to oxidative change which it is desirable to develop in a base for chewing gum.

Among the objects of the present invention is the production of gums suitable particularly for chewing gum bases, which although made from inferior types of gums on the market, such as the island jelutong, yields a product comparable with that from the best grade of F. M. S. jelutong.

Still further objects include methods of treating jelutong and related gums, rubbers, guttas, etc., and compositions containing the same, to improve the qualities and characteristics of such materials for this purpose.

Still further objects and advantages will appear from the more detailed description set forth below, it being understood, however, that this more detailed description is given by way of illustration and explanation only and not by way of limitation, since various changes therein can be made by those skilled in the art without departing from the scope and spirit of the present invention. The invention will more particularly be illustrated below in connection with the treatment of jelutong, and particularly island jelutong, that is jelutong of the inferior qualities, whereby under the methods, treatments and additions of components in accordance with the present invention, products are developed which in characteristics equal those of the best grades of gums, etc., but this use or treatment of jelutong will be exemplary only, since the methods, treatments and additions may be utilized in conjunction with other types of rubbers, gums and similar compositions.

The invention relates generally to the control of oxidation during the mixing and kneading processes required for the manufacture of a satisfactory chewing gum product. Two suitable methods of controlling this oxidation will be described in detail, the first relating to the control of the amount of oxygen available to the batch, and the second relating to the production of a similar end product thru the use of an antioxidant.

The jelutong is cut into small pieces, mixed with other gums depending upon the composition ultimately desired, and then placed in a steam-jacketed cooker and treated with steam and hot water until it is soft. The softened mixture is then placed in a heated kettle or washer provided with rotating power-driven arms capable of alternately mixing and tearing the guttas. In such a machine the mixture of guttas is washed during the mixing process by means of successive additions of clean hot water, each addition being drained off prior to the addition of the next.

During the washing process certain additions may be advantageously made, such as the inclusion of alkalies, water softeners, or detergents such as caustic soda, trisodium phosphate, sodium meta silicate, etc., which facilitate the washing operation. Generally such washing may desirably be continued for about one hour, whereupon the jelutong is reduced to a uniform, clean and pure state, but at this point it contains from 30 to 60% of water.

The mass is then treated to reduce its water content, and to subject it to mechanical and/or chemical treatment to develop in it the necessary properties. Thus the product may be kneaded in a Werner and Pfleiderer steam jacketed machine with steam constantly applied. After the completion of the washing operation, all free water is drained off, the drain is then closed, and the machine allowed to continue running with further heating to reduce the moisture of the batch, which eventually becomes a bone-dry material. While the treatment referred to may be carried out in the same vessel in which the boiling and washing was conducted, the batch may also be removed from the washer and placed in a different agitator and steam jacketed kettle for the drying operation.

In this drying operation, water is removed from the mass, and the drying is practically complete at the end of approximately seven hours. The product at this time is dark in color, and in a molten or semi-molten state, so that it can be removed and poured into suitable containers for shipping. However, at this point the mass is too tough and hard to be used as a chewing gum base, and consequently further heat treatment and manipulation of the dry material is necessary, usually for a period of some five hours after drying has been effected in order to give to the material a sufficient degree of softness to make it chewable, while still retaining that degree of springiness or rubberiness which is necessary for the chewing gum base. Such additional heating is also necessary to permit time for the mass to attain a required temperature, 125° to 135° C. at which temperature it becomes thoroughly mixed and compatible with other essential ingredients of a chewing gum base. During this kneading and heating treatment, the product is exposed to the action of oxygen in the surrounding atmosphere, and oxidative change takes place. With F. M. S. jelutong a satisfactory product for chewing gum base use is produced by following the treatments set forth above. With island jelutong and other types of guttas, a satisfactory product is not obtained, because the oxidation goes to a point where the desired properties are not present. For chewing gum base use, the base must be of a character exhibiting springiness without being too elastic. If the base is too plastic or like wax and lacking in springiness, the product is not satisfactory. The product for chewing gum base use must be one having characteristics adjusted between the extremes referred to, to give the properties necessary for this use. The operations described above yield a product from the inferior grades of jelutong which is so soft and possessed of so little springiness as to render it of lesser or perhaps negligible utility as a chewing gum base and its industrial value is only a fraction of that from F. M. S. jelutong.

Modification of the process for the treatment of the inferior grades of jelutong more particularly involve the manner of handling the jelutong or other composition in the heating and kneading operation, and particularly involve control of the character of oxidation which is permitted to take place during that period.

If jelutong of any kind is kneaded in the kneading kettle in an inert atmosphere without permitting any air, such inert atmosphere, for example, as carbon dioxide or steam, the kneading can be carried out for excessive lengths of time without development of the necessary degree of plasticity. The product is too rubbery and firm indicating little change from its original condition at the end of the drying phase of the final treatment.

On the other hand, if an atmosphere of oxygen were employed, the oxidation would be carried so far as to produce a product of extreme plasticity and softness, even in a period of time substantially less than that desirably employed.

Between those extremes of treatments condition adjustments may be made to control the characteristics of the jelutong product, which adjustments are particularly desirable in the case of island jelutong. Thus in the case of island jelutong if an atmosphere consisting of approximately a 50-50 mixture of carbon dioxide and air is utilized, the resulting product after approximately twelve hours treatment has plasticity characteristics about mid-way between two extremes noted above. Or such island jelutong composition may be kneaded in an atmosphere containing, for example, about 25% air and 75% carbon dioxide, in which case the chewing characteristics approach more closely to those obtained in an inert atmosphere. The oxidation, therefore, which is permitted to take place is controlled in order to develop the degree of plasticity, while retaining springiness. The particular properties desired in the product as a result of such treatment can be varied by the control of the amount of oxygen in the atmosphere in which the treatment takes place. For chewing gum base use, the characteristics must be kept within the range of properties indicated above, and this can be readily done by controlling the degree of oxidation which takes place. If softer products are desired, more oxidation can be permitted, while if more rubbery type products are desired, less oxidation is permitted. The control of the product to be produced is thus determined by the amount of oxygen which is permitted in the atmosphere in which the kneading operation takes place.

Or if desired, the kneading process may be carried out in the presence of steam, nitrogen, carbon dioxide, or other inert gas, in a covered kneading kettle excluding atmospheric air oxygen, but during the treatment the cover of the closed vessel may be raised from time to time, or other means may be utilized to permit the entry of a limited amount of air. Such treatment permits the desired oxidation to take place, but restricts the extent and character of it, so that at the end of the kneading and heating process of approximately twelve hours, a product is secured even from low grade jelutong which is comparable for chewing gum base use with F. M. S. jelutong that has been subjected to the more severe treatment referred to above.

Desirably the use of limited oxygen-containing atmospheres in which the treatment is carried out is commenced after or just shortly before the mass has reached a substantially dry condition, that is, usually after about five hours of kneading and heating, which as indicated above eliminates the water content present in the washed product, usually running to from 30 to 60% of the composition. There is little need of commencing the use of the controlled atmosphere prior to the time that the mass has become dry. Up to that stage, the steam given off by the mass itself during the heat treatment tends to prevent any very rapid or extensive oxidation, and the more extensive oxidation takes place after the mass has become substantially dry, and during the kneading and heating step subsequent to such dry condition. For this reason, the controlled atmosphere or the use of inert gas with occasional introduction of air or oxygen is desirably employed at or about the time the mass becomes dry.

A second way of accomplishing the desired control of the rate of and extent of oxidation of inferior jelutong of the island type or compositions containing the same, and which method may be utilized either in and of itself or in combination with the controlled atmosphere referred to above, is by the inclusion of a suitable antioxidant, more desirably to the mixture in the kneading kettle. Antioxidants, particularly of organic character may be incorporated into the jelutong product to reduce the degree of oxidation to which the product is subjected during the subsequent treatments, or to so control such oxidation as to enable satisfactory products, even for chewing gum base use to be made from inferior grades of jelutong such as the island type, which products are comparable with the compositions produced from F. M. S. jelutong. For chewing gum purposes, the antioxidant employed should desirably be non-toxic, odorless, tasteless, and should have a minimum of effect upon the color of the finished product.

Organic antioxidants, particularly useful in this connection which are non-toxic, heat resistant, tasteless and odorless, so that there is little adverse effect on the chewing gum base product produced, include more particularly organic imides, more particularly di-aryl imides, such as di-phenylamine, and di-alkylene imides, such as the morpholines, particularly para-hydroxy-phenyl morpholine. The morpholine products referred to, and particularly the individual material, para-hydroxy-phenyl morpholine, are suitable for use in this connection. A para-hydroxy-phenyl morpholine antioxidant available on the market as "Solux" can thus be utilized, and other exemplary antioxidants that may be be employed include "Neozone," which is phenyl alpha naphthylamine. Antioxidants specifically described immediately above are particularly useful in connection with the production of chewing gum base materials, and exhibit a pronounced effect in preventing oxidation of undesired character during the processing. Other antioxidants may be employed, but for chewing gum base use, they must have the inherent characteristics referred to above in order to prevent toxicity and undesired properties in the finished products.

The amount of such organic antioxidants employed may vary within substantial limits, but should be sufficient to protect the jelutong base material against undesired oxidative deterioration in the subsequent treating processes, but should not be so excessive in amount as to yield undesirable effects on taste, odor, toxicity, etc. Ordinarily an amount of from ¼ to 2% of the amount of the jelutong in the composition is sufficient to give the desired protection, an amount, for example, of .75% gives desirable results.

The antioxidants should be introduced into the jelutong composition before any substantial undesired oxidation has taken place. It may be added at the beginning of the kneading process, or perhaps sometime after that, but should be introduced a substantial time before the batch is completed. The result obtained may be varied by variation of the time at which the antioxidant is introduced, since if not introduced until the later stages of the operation, it will have permitted a greater degree of oxidation to have taken place before the antioxidant effect is exhibited, and on the other hand, if introduced early in the process, the amount of oxidation will be restricted at all times. More desirably the antioxidant may be utilized slightly before or just after the mass has reached the dry condition in the treatment as set forth above, that is, usually about five hours after the beginning of the kneading and heating operation. The introduction of the antioxidant before the mass has reached this stage of substantial dryness is undesirable because losses of the antioxidant or its effect is in part entailed during the first five hours of such drying operation. Applied at the time when the mass is substantially dry, it exerts its full effect during the remainder of the kneading and heating process, and less will desirably be employed when introduced at this point than if the antioxidant is introduced into the mass of the material prior to the time it has become substantially dry. The time of introduction of the antioxidant and the amount employed will, therefore, vary with the particular type of treatment to which the jelutong material is being subjected, and the nature of the atmosphere in which the kneading and heating operation is carried out, etc. If the jelutong is going to be subjected to extreme oxidation conditions an early introduction of antioxidant and larger amounts are desirable, whereas if, for example, by means of controlled oxygen content of the atmosphere, the degree of oxidation is necessarily reduced, less antioxidant may be employed, and this may be introduced at later stages in the operation.

Either of the methods above described for controlling oxidation of the batch during processing may be employed separately or they may be used in combination.

It should be stated at this point that it is not possible to control the degree and extent of oxidation of inferior jelutong of the island type by limiting the time during which the batch is kneaded after it has been dried. With island jelutong, as well as F. M. S. jelutong, this kneading process is desirably continued for approximately six hours after the batch has been dried. During this kneading period oxidation of the dried jelutong takes place and if properly conducted gives the product the desired balance between plasticity and firmness and elasticity and springiness, which is essential in a useful chewing gum base. If it be suggested that these desired results could be obtained with the island type of jelutong by shortening the period of the kneading process and exposure to oxidizing influences incidental thereto and that the expedients above described for controlling the oxidation of the island type jelutong either by reduction of oxygen content or addition of an antioxidant or combination of these processes is unnecessary, the answer is that extensive experience has demonstrated that this is not the case. If the period of the kneading treatment after drying of the product be materially shortened from that normally followed with F. M. S. jelutong, the product will be wholly unsuitable for use as a chewing gum base. It will be extremely firm and will lack the desirable and necessary elasticity and springiness. With the island type jelutong the oxidizing process must evidently be carried on slowly and over a period of time substantially the same as in the case of F. M. S. jelutong, and any attempt materially to shorten this period of oxidation and hasten the process will result in a product not useful as a chewing gum base. The reasons are perhaps not altogether clear. A suggested explanation is that oxidation may be selective as to different ingredients in the jelutong mass and that unless permitted to extend over the period normally required with F. M. S. jelutong certain ingredients of the island type jelutong will be oxidized while others will not be sufficiently affected. There may be other possible explanations, but the fact remains, as above stated, that the production from the island type jelutong of a chewing gum base having the desired characteristics cannot be obtained by materially shortening the normal period of the kneading process after the mass has been dried.

The product resulting from the treatment in accordance with the present invention of inferior jelutong such as the island type is clean, dry and in a preserved state in which it will remain unchanged for a period of years and which has all the desirable characteristics of the product made from F. M. S. jelutong and is practically indistinguishable from the same.

Having thus set forth my invention, I claim:

1. A composition containing a substantial amount of refined, partially oxidized island jelutong having a higher gum content and a lower resin content than that obtained by heating and kneading island jelutong in air, said composition having properties of springiness and plasticity necessary for chewing gum base use.

2. The method of preparing island jelutong for use in chewing gum bases which comprises subjecting it to a heating operation in an atmosphere containing oxygen less than that of the normal atmosphere whereby a partially oxidized island jelutong is obtained.

3. The method of preparing island jelutong for use in chewing gum bases which comprises washing island jelutong, subjecting it to a drying operation, and then kneading and heating the dried material in an atmosphere containing oxygen less than that of the normal atmosphere whereby a partially oxidized island jelutong is obtained.

4. A chewing gum base comprising refined partially oxidized island jelutong having a higher gum content and a lower resin content than that obtained by heating and kneading such jelutong in air, said jelutong having properties of springiness and plasticity necessary for chewing gum base use, and an amount of an organic substantially non-toxic antioxidant sufficient to retard materially oxidative deterioration of the jelutong during processing.

5. The method of preparing island jelutong for use in chewing gum bases which comprises washing island jelutong, subjecting it to a drying operation, and then kneading and heating the dried material in an atmosphere containing oxygen less than that of the normal atmosphere, whereby a partially oxidized island jelutong is obtained, and incorporating therewith an organic antioxidant in an amount sufficient to retard materially oxidative deterioration of the jelutong.

RICHARD P. DYCKMAN.